Feb. 28, 1956 — E. F. RIESING — 2,736,586

FLUID SEAL

Filed Dec. 5, 1952

INVENTOR.
ELLWOOD F. RIESING

BY *Willets Harduun*

ATTORNEYS

United States Patent Office 2,736,586
Patented Feb. 28, 1956

2,736,586

FLUID SEAL

Ellwood F. Riesing, Dayton, Ohio, assignor to General Motors Corporation, Detroit, Mich., a corporation of Delaware Application December 5, 1952, Serial No. 324,325

3 Claims. (Cl. 288—11)

This invention relates to fluid seals and is particularly concerned with fluid seals of the radial type.

An object of the invention is to provide a fluid seal for use in connection with a rotating member wherein the seal is held within a cavity of a housing member and seals peripherally around the rotating member and wherein a reinforcing element of mobile type is provided within the seal for maintaining its shape and its sealing efficiency.

In carrying out the above object, it is a further object of the invention to provide a radial seal of the garter spring type having a reinforcing element embedded and mounted therein, said reinforcing element being formed of a spring having the desired outer contour wherein adjacent coils of the spring are embedded in the material of the seal whereby peripheral compression on the seal member is resisted by the spring and yet, due to the separation of the coils of the spring, inward flow of the resilient material of the seal is permitted whereby a very flexible seal is provided that is readily adapted for insertion in any type of a housing member and wherein the seal shape is maintained by the spring reinforcing element.

Further objects and advantages of the present invention will be apparent from the following description, reference being had to the accompanying drawings, wherein preferred embodiments of the present invention are clearly shown.

As described in concurrently filed application, Serial No. 324,324, fluid seals of the radial type are frequently used in axle housings and the like for sealing oil and grease. In these seals, a peripheral sealing lip engages the axle or other rotating member and is held in engagement therewith through a garter spring. The outer periphery of the seal abuts a housing and is sealingly engaged thereto. These seals, in most instances, are forced into the housing and against the shoulder by means of a pilot rod or other suitable tool. In order to properly permit this type of insertion, the seal should be capable of some small degree of radial compression without distortion and to this end the present invention is particularly directed.

Figure 1:
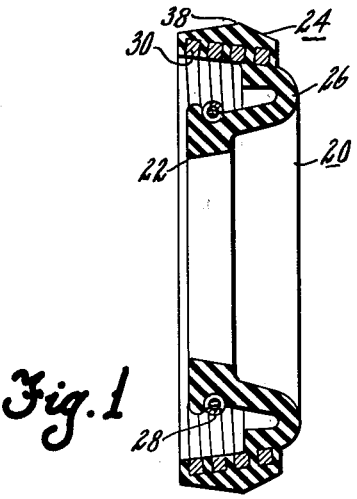
Fig. 1 is a view in cross section of one type of seal to be described herein.

Referring specifically to Fig. 1, a seal 20 is shown including a peripheral sealing lip 22 and an outer sealing member or ring 24. The lip 22 is connected to the member 24 by a diaphragm or bellows member 26 which permits a limited longitudinal movement of the lip 22. A garter spring 28 urges the lip 22 radially inwardly. Within the sealing member or body 24 of the device, is a reinforcing element 30, in this instance, a spring made from square wire. This spring is inserted during the molding of the seal and the rubber-like resilient material of the seal completely envelopes the spring and flows between the coils thereof.

Figure 2:
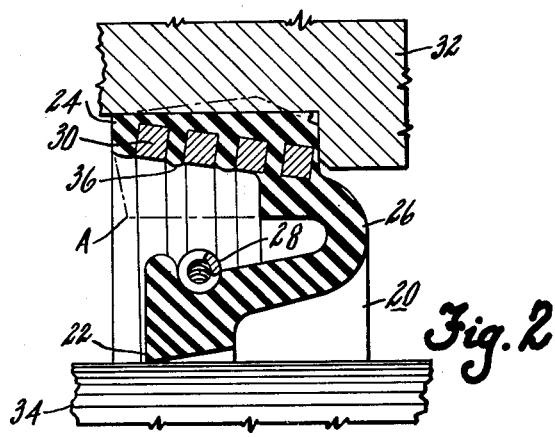
Fig. 2 is a fragmentary enlarged view in cross section of the seal shown in Fig. 1, wherein the seal has been inserted within a housing.

The entire assembly 20 is quite flexible in its application since, as shown in the enlarged view in Fig. 2, when the seal 20 is inserted in a housing 32 with the lip 22 sealing on a shaft 34, the resilient material in the body portion 24 is capable of bulging outwardly as at 36 between the coils thereof. This permits considerable flow of material so that the seal 20 is always maintained in tight engagement to the housing without any excessive strains or buckling forces being exerted thereon.

It will be noted that in Fig. 1, the body portion 24 is shaped to provide additional material at 38, which material, as shown in Fig. 2, is caused to flow when the seal is inserted. This assures a tight sealing engagement with the housing.

Figure 3:
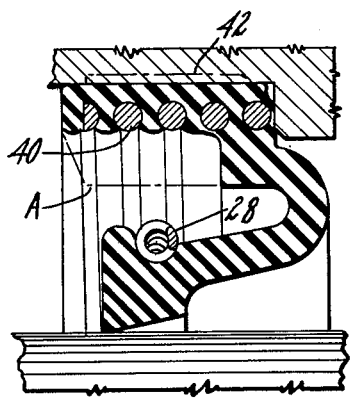
Fig. 3 is a view similar to Fig. 2 of a modified design.

Fig. 3 shows a modification of the design wherein a round wire spring 40 is utilized and wherein the dotted line portion noted at 42, indicates the free shape of the device.

Figure 4:
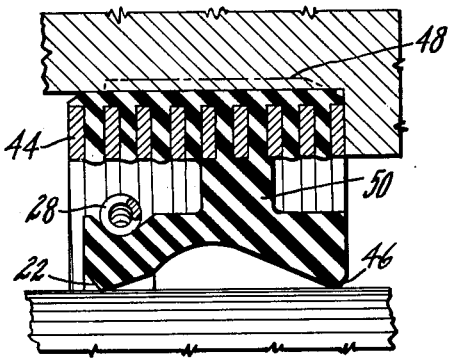
Fig. 4 is a view similar to Fig. 2 of another modification of a seal design.

Fig. 4 shows another modification of the seal wherein a flat wire spring 44 is utilized and wherein the seal includes a second sealing lip 46 extending in opposed relation to the sealing lip 22 thereon. Lip 46, in this instance, does not utilize a garter spring. The free shape of the seal, shown in Fig. 4, is noted in dotted lines at 48. In this particular seal design, the spring 44 extends an appreciable distance past the connecting portion 50 between the main body member and the sealing lips and this type of seal is adapted for use in several special installations where additional sealing facilities are required.

Figure 5:
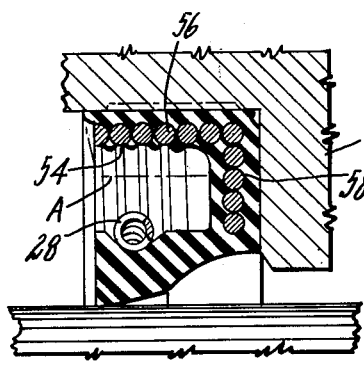
Fig. 5 is a view similar to Fig. 2 of still another modification of a seal design.

Fig. 5 shows still another modification of the design of seal as shown at 20 in Fig. 1. In this instance, the spring 54 is a tightly wound spring having a generally cylindrical portion 56 and a plate-like portion 58 extending substantially at right angles thereto. The entire spring is wound from a single piece of wire and the distance between the coils is such that adjacent coils substantially abut one another. This particular design is adapted for use in a deep cut housing with a heavy shoulder as shown at 60. The same general advantages are apparent in this seal in that the spring reinforcing member 54 is sufficiently mobile to accommodate irregularities in the housing and permit the seal to be seated without any buckling tendencies which cause considerable difficulty in many prior art type seals of this general character.

It is apparent that in all embodiments, the seal is of the radial type and includes a reinforcing member for peripherally reinforcing the body portion thereof, which reinforcing member is of spring type wherein radial or peripheral compression of the seal is opposed by the reinforcing spring and wherein the spring is sufficiently mobile to overcome irregularities, etc., in the housing whereby good sealing qualities are obtained between the seal and the housing regardless of roughness, etc. Similarly, due to the ability of the resilient rubber-like material in the body of the seal to flow, it is possible for excess material, as occasioned by forcing the seal into the housing, to flow through the spring and bulge outwardly on the periphery of the seal so as to cause self-adjustment of the seal with respect to any of the housings into which it is to be inserted.

In all of the embodiments shown herein, the spring reinforcement can actually rotate to reduce its overall diameter during insertion to increase the flexibility and ease of installation. I have found that when the spring is bonded to the elastomer that as much as 7° angular movement occurs with a 1½ inch shaft during the "winding up" process. The shear load on the elastomer caused by this action stiffens up the seal and improves its overall function.

In the modifications shown in Figs. 2, 3 and 5 the dot and dash lines marked at A at the inner sides of the seals indicate radially spaced longitudinally extending stiffening ribs akin to castellations. These may or may not be used according to the application.

It is also manifest that in the design shown, for example, in Figs. 1 and 2, and the remaining figures of the drawing, the spring reinforcing element may be of any desired shape, for example, frustro conical or cylindrical, that is to say, the spring reinforcing member may be out of parallelism with the wall of the housing or may be parallel with the wall of the housing when the seal is installed, the particular design of the spring reinforcing member being chosen with respect to the specific application in which the seal is to be used.

While the embodiments of the present invention as herein disclosed, constitute preferred forms, it is to be understood that other forms might be adopted.

What is claimed is as follows:

1. A fluid seal of the radial type adapted to be interposed between a housing member and a shaft, comprising in combination; an annular elastomeric body member having a free shape including an outer diameter less than the diameter of the housing and an outer diameter greater than the diameter of the housing, an integral annular resilient sealing ring including the lip thereon adapted to seal against the shaft, a flexible annular diaphragm portion connecting the body member and the sealing ring and integrally formed therewith, a garter spring surrounding the sealing lip, and a coil spring having spaced convolutes molded within the body member, said spring extending axially of said body member for providing a reinforcement therein against radial deformation thereof and for permitting excess body material occasioned by forcing the seal into the housing to flow between the spaces of said spring convolutes whereby said seal is self-adjusting.

2. A fluid seal of the radial type adapted to be interposed between a housing member and a shaft, comprising in combination; an annular elastomeric body member having a free shape including an outer diameter less than the diameter of the housing and an outer diameter greater than the diameter of the housing, an integral annular resilient sealing ring including a lip thereon adapted to seal against the shaft, a flexible annular diaphragm portion connecting the body member and sealing ring and integrally formed therewith, and a coil spring having spaced convolutes molded within the body member, said coil spring extending axially of the body member in substantial juxtaposition to the housing for providing a reinforcement within the body member against radial deformation thereof and for permitting excess body material occasioned by forcing the seal into the housing to flow between the spaces of said spring convolutes whereby said seal is self-adjusting.

3. A fluid seal of the radial type adapted to be interposed between two relatively rotatable members, comprising in combination; an annular elastomeric body member having a snug nonrotative fit with respect to one of said members, an annular resilient sealing ring including a lip thereon adapted to slidingly seal against the other of said members and a flexible annular diaphragm portion connecting the body member and the sealing ring and integrally formed therewith, and a coil spring having spaced convolutes molded within said body member, said coil spring extending axially along said body member in substantial juxtaposition to said nonrotative member wherein said coil spring supports said body member against radial deformation and permits excess body material occasioned by forcing the seal between said relatively nonrotatable members to flow between the spaces of said spring convolutes whereby said seal is self-adjusting.

References Cited in the file of this patent

UNITED STATES PATENTS

| | | |
|---|---|---|
| 2,207,371 | Blackmore et al. | July 9, 1940 |
| 2,310,607 | Batesole | Feb. 9, 1943 |
| 2,385,156 | Newell | Sept. 18, 1945 |
| 2,417,390 | Winkeljohn | Mar. 11, 1947 |
| 2,430,445 | Aamodt et al. | Nov. 11, 1947 |
| 2,437,901 | Winkeljohn | Mar. 16, 1948 |
| 2,467,210 | Helfrecht | Apr. 12, 1949 |
| 2,651,534 | Kosatka | Sept. 8, 1953 |
| 2,692,786 | Reynolds | Oct. 26, 1954 |

FOREIGN PATENTS

| | | |
|---|---|---|
| 541,336 | Great Britain | Nov. 24, 1941 |